3,109,507
VEHICLE SPEED WARNING AND CRUISE
CONTROL SYSTEM
Eugene C. McMurray and Robert C. Schniers, Flint,
Mich., assignors to General Motors Corporation,
Detroit, Mich., a corporation of Delaware
Filed July 23, 1962, Ser. No. 211,763
7 Claims. (Cl. 180—82.1)

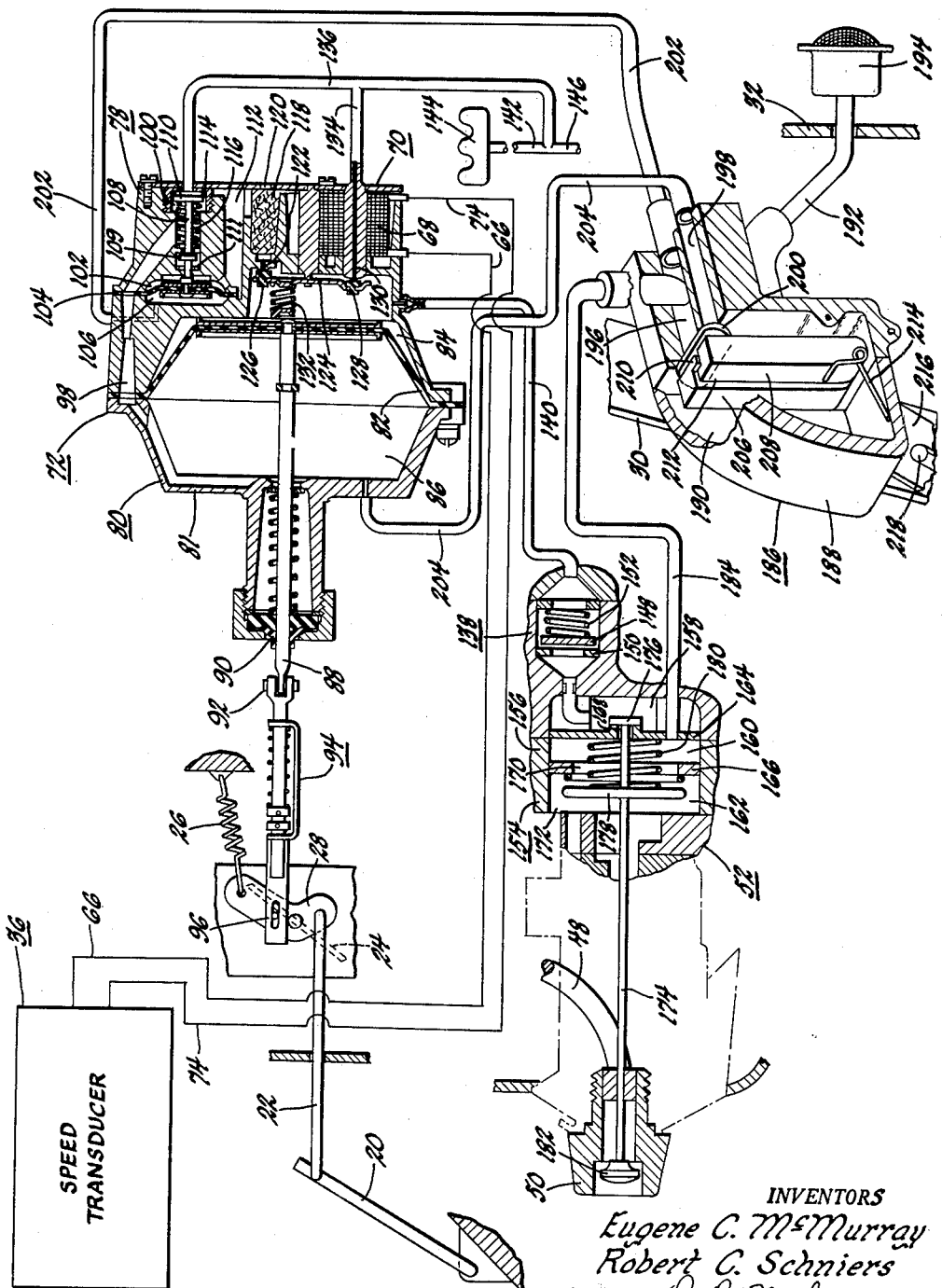

The invention relates to improvements in a control mechanism for an automotive vehicle and particularly in a mechanism which provides a warning to the vehicle operator when a predetermined vehicle speed is reached in one mode of operation, and in another mode of operation maintains the vehicle at a predetermined road speed under varying conditions. A mechanism embodying the invention utilizes the proportional control pressure, which provides the speed warning sense, to engage the mechanism in the cruise control mode of operation upon manual selection of that mode by the vehicle operator. Since the proportional control pressure in the system can exist only upon substantial attainment by the vehicle of the set vehicle speed, the cruise control mode of operation cannot be obtained until this speed is reached under manual control conditions. The system provides for discontinuance of the cruise control mode of operation upon application of the vehicle brakes through the cruise mode control line, and also provides a secondary release by directly venting the cruise control chamber of the power servo upon sufficient brake pedal movement. The system employs several components generally similar to the system disclosed in the copending application Serial No. 67,820, entitled Vehicle Speed Warning and Cruise Control System, and filed November 7, 1960; the copending application Serial No. 211,491 entitled Vehicle Speed Warning and Cruise Control System with Pre-engagement Inhibiting Means, and filed July 23, 1962; and the copending application Serial No. 211,490 entitled Fluid Pressure System and Valve Control Assembly Therefor, and filed July 23, 1962. The related disclosures of each of these applications are therefore specifically referred to below and incorporated herein by reference.

In the drawing:

The FIGURE is a schematic diagram of a system embodying the invention, with certain elements thereof shown broken away and in section. The system is shown in the speed warning mode with the vehicle in an overspeed condition.

The usual accelerator pedal 20 is connected to a throttle rod 22 for control of the engine throttle valve 24 in the usual well known manner. A throttle return spring 26 is suitably attached to the throttle linkage of which arm 28 and rod 22 are parts, and urges the engine throttle valve 24 toward the zero throttle or engine idle condition. Arm 28 is attached to the throttle valve so that it moves the valve under influence of throttle rod 22 and spring 26. The usual vehicle brake actuating pedal arm 30 is suitably attached to a portion of the vehicle such as wall 32 and a suitable brake pedal return spring urges the arm to the brake release position.

The speed transducer 36 senses vehicle speed and is set at the desired speed for either the speed warning or cruise control mode of operation by the speed set knob 50 of the control head 52 which acts through the drive member 48. The operation of the speed transducer 36 will generate an electrical proportional control or speed error signal to be transmitted to the electromagnet assembly 68 through leads 66 and 74 and cause a fluid pressure proportional control signal to be generated in the power unit 72 in the manner shown and described in the first two of the above noted applications.

The power unit 72 includes the proportional control valve section 70, the cruise control mode section 78 and the power servo section 80. The power servo section includes a housing 81 having a power diaphragm 82 separating the housing into a speed warning chamber 84 and a cruise control chamber 86. The servo rod 88 is connected to the diaphragm 82 and extends through the housing wall which has a suitable seal 90 mounted therein. Rod 88 is pivotally connected at 92 to a lost motion linkage 94 which is attached to arm 28 of the throttle valve linkage through a suitable pin and slot arrangement 96.

A passage 98 in the power unit housing connects cruise control chamber 86 with a chamber 100 formed in a portion of the housing as a part of the cruise control mode section 78. Chamber 100 connects with another chamber 102 formed by a portion of the housing and separated by a diaphragm 104 from a chamber 106. Chambers 100 and 102 may be sealed from each other by a valve 109 mounted on a rod 108 attached to diaphragm 104 and movable therewith. Rod 108 extends through chamber 102 and chamber 100 and has another valve 110 which is engageable with the valve seat 114. Spring 116 urges valve 110 against its valve seat 114 and therefore urges valve 109 away from its valve seat 111. A chamber 112 is connected with chamber 102 and receives air under atmospheric pressure through filter 118 and air inlet 120. Chamber 102 is therefore always at atmospheric pressure.

An orifice 122 is provided in the housing wall so that atmospheric air passing through filter 118 can also enter speed warning chamber 84 under controlled conditions. The pivoting proportional control valve unit 124 has valve faces 126 and 128 which operates under influence of the speed error signal provided to electromagnet assembly 68 to provide a fluid proportional control pressure in speed warning chamber 84. Valve 126 is movable upon pivotal movement of valve unit 124 to open and close atmospheric air orifice 122 while valve face 128 moves oppositely to close and open a vacuum orifice 130. A spring 132 urges valve unit 124 to hold valve face 126 against orifice 122 to close that orifice when the coil of electromagnet assembly 68 is not electrically energized. The magnetic force of the electromagnet assembly 68 attracts the end of valve unit 124 on which valve face 128 is mounted when the assembly is electrically energized to open orifice 122 and close orifice 130. It can be seen that the period of time in which atmospheric air can enter speed warning chamber 84 is determined by the period of energization of electromagnet assembly 68 in relation to its period of deenergization.

A conduit 134 connects the orifice 130 to the vacuum supply conduit 136 which in turn is connected through conduit 142 to a suitable source of vacuum such as the engine intake manifold 144. Conduit 146 may be connected to other suitable vacuum operated accessories on the vehicle. Conduit 136 is also connected to chamber 100 adjacent valve seat 114 so that there is fluid communication between chamber 100 and conduit 136 only when valve 110 is unseated. A conduit 140 is connected from speed warning chamber 84 to the control head 52 through the check valve assembly 138. Conduit 140 is the inhibiting function line of the system and communicates the fluid pressure from speed warning chamber 84 to the control head 52. Check valve assembly 138 includes a valve 148, a valve seat 150 and a spring 152 urging the valve against the seat but permitting the valve to be held open when there is a sufficiently low pressure in speed warning chamber 84 and conduit 140.

The control head 52 includes a control valve assembly 154 having a housing 156 divided into chamber 158, 160 and 162 by walls 164 and 166. An orifice 168 formed through wall 164 interconnects chambers 158 and 160 and an orifice 170 formed through wall 166 interconnects chambers 160 and 162. Chamber 162 is vented to the atmosphere at 172. A valve rod 174 extends through orifices 170 and 168 and is provided with a valve 176 which may close orifice 168 and a valve 178 which may close orifice 170. Spring 180 normally holds valve 178 in the open position and valve 176 in the closed position. Rod 174 has a button 182 on its other end which may be recessed in speed set knob 50 and may be pushed inwardly to engage the mechanism in the cruise control mode by closing valve 178 against wall 166 to close orifice 170 and opening valve 176 to open orifice 168. Details of the relationship of the speed control head 52 and the speed transducer 36 are also disclosed in the first two above noted applications to which reference may be made.

A conduit 184 is connected to chamber 160 of control valve assembly 154 and to the brake pedal release valve assembly 186. This assembly includes a housing 188 in which a chamber 190 is formed. The air inlet conduit 192 is connected to chamber 190 and maintains that chamber at atmospheric pressure. Conduit 192 may extend through the wall 32, which may be the firewall of the vehicle, and have a filter 194 at its intake end. When filter 194 is located out of the passenger compartment, any air intake noises originating in the valve assembly 186 will not be heard in the passenger compartment. Details of construction of a valve assembly similar to the valve assembly 186 are disclosed and claimed in the third of the above noted applications, together with modified valve assemblies which may also be used. Reference is therefore made to the disclosure of that application.

Valve assembly 186 is also provided with passages 196 and 198 connecting with chamber 190 and having their inner ends passing through a suitable sealing type valve seat 200. Conduit 184 is connected to passage 196 as is conduit 202. These two conduits together with passage 196 provide the cruise mode control circuit connecting control valve assembly 154 with the cruise mode section 78 of the power unit 72. Conduit 202 is connected to a passage in the power unit housing leading to chamber 106. Conduit 204 is connected to passage 198 of valve assembly 186 and to cruise control chamber 86 of the power unit 72. This conduit provides a secondary release circuit directly to the power unit. A pair of pivot valves are pivotally mounted in chamber 190 of valve assembly 186 and include the cruise mode control valve 206 and the secondary release valve 208. Valves 206 and 208 are constructed in an overlapping manner so that the tongue 210 of valve 206 underlies and is separated from the tongue 212 of valve 208 when the valves are closed. Valve 206 is normally held closed by the brake arm return spring acting on the brake arm and pin 218 which moves arm 216 tied directly to valve 206, while valve 208 is normally held in the closed position by means of the return spring 214 so that their outer ends engage the valve seat 200, with valve 206 closing off communication of passage 196 with chamber 190 and valve 208 closing off communication of passage 198 with chamber 190. A valve actuating arm 216 is attached to valve 206 and slidably engages a pin 218 on the brake pedal arm 30 so that brake engaging movement of arm 30 is transmitted through pin 218 and valve arm 216 to move valve 206 and open communication between passage 196 and chamber 190. Continued movement of the brake arm 30 results in continued movement of valve 206 against the brake arm return spring until the valve tongue 210 engages the valve tongue 212 of valve 208. Further opening movement of valve 206 opens valve 208 so that passage 198 also communicates with chamber 190. Upon release of the brake pedal the brake arm returns to the released position, carrying valve arm 216 with it and allowing return spring 214 to close valve 208.

In the speed warning vehicle underspeed condition valves 206 and 208 are closed and valve 178 is open so that chamber 160 is at atmospheric pressure, thereby keeping cruise mode control conduits 184 and 202 at atmospheric pressure together with passage 196 and chamber 106. Valve 176 is closed as is check valve 148. Valve face 128 is held so that orifice 130 is closed since the electromagnet assembly 68 is constantly energized by the speed transducer 36 under this condition. Valve face 126 therefore is disengaged from orifice 122 and speed warning chamber 84 is at atmospheric pressure. Chamber 102 of the cruise control mode section 78 is at atmospheric pressure so that spring 116 holds valve 110 against its seat 114 and valve 109 away from its seat 111. Chamber 100 is therefore at atmospheric pressure, together with passage 98 and cruise control chamber 86 of the power unit. Conduit 204 and passage 198 are therefore at atmospheric pressure. Intake manifold vacuum from manifold 144 is present in conduits 142, 146, 136 and 134. Since atmospheric pressure is on both sides of diaphragm 82 the diaphragm exerts no force in either direction on the throttle linkage and the throttle valve 24 is under direct vehicle operator control through accelerator pedal 20.

As the vehicle reaches the set vehicle speed, speed transducer 36 sends an electrical proportional control or speed error signal to electromagnet assembly 68, causing valve unit 124 to pivot back and forth and cyclically opening orifice 130 to decrease the pressure in speed warning chamber 84 in accordance with the speed error signal. The decrease in pressure in chamber 84 will cause diaphragm 82 to move to the right, moving servo rod 88 with it. This exerts a back pressure force on the accelerator pedal 20 through linkage 94, pin and slot connection 96, arm 28 and throttle rod 22. If the operator continues to hold accelerator pedal 20 down so that the vehicle continues to maintain the overspeed or to accelerate further, override spring 94 permits relative movement between servo rod 88 and arm 28 so that the operator may maintain such a speed condition. However, he is acutely aware of the overspeed condition because of the additional force against his foot tending to close the throttle valve. The reduced pressure in chamber 84 is transmitted through conduit 140 to open check valve 148 and provide the reduced pressure in chamber 158. Since valve 176 is closed, however, atmospheric pressure is maintained in chamber 160.

Should the operator desire to engage the system in the cruise control mode of operation upon reaching the set speed, he pushes button 182 inwardly until valve 178 closes orifice 170 while 176 opens orifice 168. Chamber 160 is then subjected to the reduced pressure in chamber 158 and this pressure acting on the area of valve 178 and cooperating with atmospheric pressure in chamber 162 holds the valve in position to maintain orifice 170 closed against the force of spring 180. The proportional control reduced pressure of chamber 84 is then transmitted from chamber 160 through conduit 184, passage 196 and conduit 202 to chamber 106 of the cruise control mode section 78. This reduced pressure moves diaphragm 104 to the left against spring 116 to seat valve 109 against its seat 111 and to open valve 110. The atmospheric pressure in chamber 102 is therefore sealed from chamber 100 and chamber 100 is open to the intake manifold vacuum conduit 136 so that the full reduced pressure of raw intake manifold vacuum is transmitted from chamber 100 through passage 98 to cruise control chamber 86. This reduced pressure acts on diaphragm 82 in opposition to the proportional control pressure 84 to balance that pressure with throttle return spring 26 and control the throttle valve 24 to maintain the vehicle at a constant road speed. If the vehicle slows down slightly due to an increased load on the engine the speed error signal indicates a speed error below the set speed, therefore keeping electromagnet assembly 68 energized for a greater period of time to increase the absolute pressure in chamber 84 and permit the relative pressures in chambers 84 and 86 to move the throttle valve to a further open position to increase vehicle speed. If the vehicle tends to overspeed slightly, the reverse situation occurs so that diaphragm 82 is moved to control the throttle valve to decrease engine speed.

If while operating in the cruise control mode the operator desires to disengage the system from that mode of operation, he presses on the brake pedal so that mode control valve 206 is opened. The atmospheric pressure in chamber 190 is then received in passage 196 and mode control conduits 184 and 202. Atmospheric pressure then occurs in chamber 160, allowing valve 178 to move to the left under influence of spring 180 and closing valve 176. Atmospheric pressure is also transmitted to chamber 106 of the cruise control mode section 78 which, together with spring 116, opens valve 109 and closes valve 110. Air under atmospheric pressure then passes through chamber 100 and passage 98 to the power unit cruise control chamber 86. This places the unit back in the cruise warning mode of operation. Chamber 86 may also be directly evacuated if the brake arm 30 has been moved sufficiently to open secondary release valve 208. The atmospheric pressure of chamber 190 would then be connected directly to chamber 86 through passage 198 and conduit 204. In order to reengage the system in the cruise control mode the operator must again reach the set speed and push button 182.

We claim:

1. In a vehicle road speed control system having a speed warning mode of operation and a constant vehicle speed maintaining mode of operation, a power servo having a movable power member separating a power warning pressure chamber and a speed maintaining pressure chamber formed in said servo, means generating a vehicle speed error signal and establishing a speed warning pressure in said speed warning pressure chamber acting on said movable power member when the vehicle speed error signal indicates that the actual vehicle speed has reached a predetermined desired vehicle speed; the improvement comprising, inhibiting valve means normally venting said speed maintaining pressure chamber to atmosphere and having speed warning pressure responsive valve operating means for operating said inhibiting valve means, conduit means connecting said valve operating means with said speed warning pressure chamber, said valve operating means being operable by speed warning pressure from said speed warning pressure chamber to operate said inhibiting valve means to close the atmospheric vent of said speed maintaining pressure chamber controlled by said inhibiting valve means and to interconnect said speed maintaining pressure chamber to a source of speed maintaining pressure only while speed warning pressure exists in said speed warning pressure chamber.

2. The mechanism defined by claim 1, further comprising conduit means interconnecting said speed maintaining pressure chamber with atmosphere and having normally closed vehicle operator operable valve means for overriding said inhibiting valve means to disestablish the speed maintaining mode of operation by directly venting said speed maintaining chamber to atmosphere when said normally closed valve means is opened.

3. The mechanism defined by claim 1, said conduit means having a control head including vehicle operator operable valve means therein, said vehicle operator operable valve means having a first position venting said inhibiting valve operating means to atmosphere through a portion of said conduit means while disconnecting said speed warning chamber therefrom and a second position closing the atmosphere vent controlled thereby and interconnecting said speed warning chamber to said inhibiting valve operating means through said conduit means.

4. The mechanism defined by claim 3, said conduit means having a check valve therein intermediate said speed warning chamber and said vehicle operator operable valve means in said control head responsive to speed warning pressure in said speed warning chamber to close said conduit means when said speed warning pressure approaches atmospheric pressure.

5. The mechanism defined by claim 1, said conduit means having vehicle operator operable means therein for venting said valve operating means to atmosphere to operate said inhibiting valve means to vent said speed maintaining pressure chamber to atmosphere and disconnect said speed maintaining pressure chamber from the source of speed maintaining pressure, thereby disestablishing the constant speed maintaining mode of operation.

6. The mechanism defined by claim 5, said vehicle operator operable valve means having additional conduit means directly connected to said speed maintaining pressure chamber and normally closed by said valve means and connected to atmosphere when opened by said valve means.

7. In a vehicle road speed warning and constant speed maintaining control system having a differential fluid pressure operated servo, means for generating a first fluid pressure responsive to speed error and delivering said first fluid pressure to said servo to establish a speed warning mode of operation, a source of a second fluid pressure, connectable with said servo, means responsive to said first fluid pressure delivered to said servo and including first valve means for preventing the delivery of said second fluid pressure to said servo until said first fluid pressure is delivered to said servo, and vehicle operator operable valve means for disconnecting said first fluid pressure responsive means from said servo whereby said first valve means remains in the second fluid pressure delivering preventing condition even after said first fluid pressure is delivered to said servo.

References Cited in the file of this patent

UNITED STATES PATENTS 2,966,224 Teetor _____ Dec. 27, 1960